(12) United States Patent
Baek et al.

(10) Patent No.: US 7,836,114 B2
(45) Date of Patent: Nov. 16, 2010

(54) APPARATUS FOR GENERATING RANGING BINARY CODE SEQUENCE AT HIGH-SPEED, AND METHOD THEREOF

(75) Inventors: YoungSeok Baek, Daejeon (KR); Jung-Bum Kim, Daejeon (KR); Kyoung-Soo Kim, Daejeon (KR); Iksoo Eo, Daejeon (KR); Hee-Bum Jung, Daejeon (KR)

(73) Assignee: Electronics and Telecommunications Research Insitute, Daejeon (KR)

( * ) Notice: Subject to any disclaimer, the term of this patent is extended or adjusted under 35 U.S.C. 154(b) by 908 days.

(21) Appl. No.: 11/689,547

(22) Filed: Mar. 22, 2007

(65) Prior Publication Data
US 2008/0012745 A1 Jan. 17, 2008

(30) Foreign Application Priority Data
Jul. 13, 2006 (KR) ...................... 10-2006-0065941

(51) Int. Cl.
*G06F 7/58* (2006.01)
(52) U.S. Cl. ..................................... 708/250
(58) Field of Classification Search .......... 708/250–256
See application file for complete search history.

(56) References Cited
U.S. PATENT DOCUMENTS
2008/0056193 A1* 3/2008 Bourlas et al. .............. 370/331
2008/0170632 A1* 7/2008 Sohn et al. .................. 375/260

FOREIGN PATENT DOCUMENTS

| KR | 10-2005-0089709 | 9/2005 |
|---|---|---|
| KR | 10-2006-0055636 | 5/2006 |
| KR | 1020060055636 | 5/2006 |
| WO | WO 2006-054848 | 5/2006 |

OTHER PUBLICATIONS

"Specifications for 2.3GHz band Portable Internet Service", TTAS. KO-06.0082, http://www.wibro.or.kr/standard.htm.
"Specifications for 2.3GHz band Portable Internet Service", TTAS. KO-06.0064, http://www.wibro.or.kr/standards.htm.
Korean Notice of Patent Grant dated Feb. 13, 2008.

\* cited by examiner

*Primary Examiner*—Tan V Mai
(74) *Attorney, Agent, or Firm*—Ladas & Parry LLP

(57) ABSTRACT

Provided is an apparatus for generating a ranging binary code sequence at a high-speed, and a method thereof. The apparatus includes: an initial register value generator for generating initial register values of minimum valid ranging codes; a storage for storing the generated initial register values of the valid ranging codes($\leq K$, where K is the ranging value transmitted by base station); a binary code sequence generator for generating a binary code sequence of a corresponding ranging code; and a procedure for incrementally updating the initial register values as receiving the new ranging code from base station.

6 Claims, 5 Drawing Sheets

APPARATUS FOR GENERATING RANGING BINARY CODE SEQUENCE AT HIGH-SPEED, AND METHOD THEREOF

FIELD OF THE INVENTION

The present invention relates to an apparatus for generating a ranging binary code sequence at a high-speed, and a method thereof; and, more particularly, to an apparatus for generating a ranging binary code sequence at a high-speed to shorten a generation time by storing a pseudo random bit sequence (PRBS) register initial values of minimum valid ranging codes in a memory, reading the initial register value of the ranging code transmitted from a base station, setting up the initial value in the PRBS register of a ranging binary code sequence generator, and directly generating 144 binary codes, and a method thereof.

DESCRIPTION OF RELATED ART

A communication system including a base station operating based on a reference timing, particularly Worldwide Interoperability for Microwave Access (WiMax)/mobile WiMax radio system, estimates a time to be consumed until a signal transmitted from a terminal arrives at the base station and controls a transmission timing of each terminal. Accordingly, the signal of each terminal can arrive at the base station at different timings.

When a terminal accesses to a new base station, it goes through a series of procedures for measuring a signal transmission delay time to new base station. The procedures are defined as initial ranging.

Since the base station receives the initial ranging signal through a timing, which is different from the timing of the signals of another terminal going through an initial ranging procedure, the initial ranging signal does not cause interference in the signal of other terminal.

A ranging signal includes an initial ranging signal, a bandwidth request ranging signal, a periodical ranging signal, and a hand over ranging signal. The initial ranging signal is used for initial connection with the base station. The bandwidth request ranging signal is used when the mobile station requests a bandwidth for transmitting data to the base station. The periodical ranging signal is used to periodically transmit a status of the mobile station to the base station. The hand over ranging signal is used for a hand over procedure.

Generally, a ranging circuit used in a physical layer is a pseudo random bit sequence (PRBS) circuit as shown in FIG. 1. The ranging signal is a pseudo noise code generated by the circuit. A polynomial generator used in the PRBS circuit is $1+x1+x4+x7+x15$ and initialized by an initial register value where $b15:b1=0,0,1,0,1,0,1,1,s0,s1,s2,s3,s4,s5,s6$. The s6 is the least significant bit (LSB) among initial register values and the s6 to s0 means an uplink permbase, i.e., UL_PermBase where s6:s0=UL_PermBase. The s6 is the most significant bit (MSB) among uplink permbase of 7-bit-string. The s0 is the LSB among uplink permbase of 7-bit-string. An uplink permbase value is included in an uplink map, i.e., UL_MAP, of a frame used in the inside of the mobile WiMax. The uplink permbase value is a variable value that the base station transmits to the mobile station.

A binary ranging code sequence means a sequence of the pseudo noise shown in an output $C_k$ of ranging circuit. One ranging code means a sequence including 144 binary codes, i.e., the binary code sequence. A total of 256 ranging codes, which are 256×144 binary codes, are generated.

The sequence including first 144 binary codes is defined as a ranging code 0 and the next sequence including 144 binary codes is defined as a ranging code 1, and so forth.

A total of 256 ranging codes are defined by sequentially designating numbers ranging code 2 to 255 to units of 144 binary codes.

An operation of the PRBS circuit will be described in detail with reference to FIG. 1.

A result outputted based on the initial register value recorded in a PRBS register, which is $C_k$, is inputted to a first register s6. A value recorded in the s6 is shifted to s5 and a value recorded in the s5 is shifted to s4 simultaneously.

When the first 144 outputs are generated, i.e., when the 144 binary codes of the ranging code 0 are generated in the same manner as described above, 15 values recorded in the PRBS register become initial register values required for generating next 144 binary codes, i.e., the ranging code 1.

When next 144 outputs are generated, i.e., when binary codes of the ranging code 1 are generated based on the 15 values recorded in the PRBS register in the same manner as described above, 15 values recorded in the PRBS register become an initial register value required for generating a ranging code 2.

A mobile station having the PRBS circuit generates a sequence including 144 binary codes based on the ranging code number transmitted from the base station. The generated binary code sequence is used to create signals to be transmitted/received in a ranging channel.

Therefore, when the ranging code number is K, the number of clocks generally required for generating the ranging binary code sequence is "144×(K+1)". When the ranging code number is P, which is a value smaller than K, the number of clocks required for generating the ranging binary code sequence is "144×(P+1)", and the number of clocks required for generating the ranging code P is duplicated.

For example, when K is 167 and P is 89, a terminal generates 168 sequences of a ranging code 0 to a ranging code 167 and generates 90 sequences of the ranging code 0 to a ranging code 89. Herein, one sequence includes 144 binary codes.

Therefore, when an uplink permbase value is not changed, there is a problem that the binary code sequence of the ranging code 0 to the ranging code 89 is doubly generated. The redundant code sequences of the ranging codes are accumulated and duplicated whenever new ranging codes are continuously generated.

To solve this conventional duplication problem, new technology for generating an initial register value of the PRBS circuit with respect to 256 all ranging codes, storing the initial register value of ranging code 0 in a memory, extracting an initial register value of the PRBS circuit with respect to corresponding ranging codes 1 to 255, if necessary, defining the initial register value in the PRBS register, and generating a ranging binary code sequence is suggested.

When the uplink permbase value is not changed within a small time range, the new technology is practical. However, when the uplink permbase value transmitted from the base station such as handoff is frequently changed, there is a problem that an initial value of the PRBS register with respect to all of 256 ranging codes should be newly generated and stored in the memory whenever the uplink permbase value is changed.

The new technology has a problem that the 256 all PRBS initial register values should be generated even though the terminal uses only small part of the ranging codes, for examples, even though the terminal uses the ranging codes 0 to 127 among the 0 to 255 ranging codes.

SUMMARY OF THE INVENTION

It is, therefore, an object of the present invention to provide an apparatus for generating a ranging binary code sequence at a high-speed, which can shorten a part doubly generated when 144 code sequences are generated based on a ranging code number and decrease a generation time by generating initial register values of a pseudo random bit sequence (PRBS) of a minimum valid ranging code range($\leq$RangingCode, where RangingCode is the ranging code number transmitted from the base station) based on an uplink permbase (UL_PermBase) value and a ranging code number transmitted from a base station, storing the initial register values in a memory, extracting an initial register value of a corresponding ranging code number stored in the memory, setting up the initial register value in a PRBS register of a ranging circuit, performing the ranging circuit as long as a length of the binary code sequence, and generating a ranging signal, and a method thereof.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided an apparatus for generating a ranging binary code sequence at a high-speed, including: an initial register value generator for generating an initial register value of each of ranging codes in a predetermined minimum range based on an ranging code number transmitted from base station; a storage for storing the generated initial register values of the ranging codes; a binary code sequence generator for generating a binary code sequence of a corresponding ranging code based on the stored initial register value of each ranging code; and a controller for receiving a first frame including a first uplink permbase value, which is a UL_PermBase value, and a first ranging code number from a base station, recording the first uplink permbase value in the register of the initial value generator, generating the initial register value of each of ranging codes ranging from the ranging code 0 to the received ranging code number through the recorded first initial value, controlling the above initial register value storing procedure, reading an initial register value of a corresponding ranging code in the storage, and controlling each constitutional element to generate a ranging binary code sequence.

In accordance with another aspect of the present invention, there is provided a method for generating a ranging binary code sequence at a high-speed, including the steps of: a) receiving a first frame including a first uplink permbase value, which is a UL_PermBase, and a first ranging code number from the base station and recording the first uplink permbase value in a register of an initial value generator; b) generating an initial register value of each of ranging codes ranging from the ranging code 0 to the received ranging code number through the recorded first initial value and storing the initial register value of each ranging code in a memory; and c) reading an initial register value of a corresponding ranging code number in the memory and generating a ranging binary code sequence.

Also, the present invention does not generate initial register values of the PRBS register within a range of all ranging codes from 0 to 255, but generates initial register values ranging 0 to RangingCode, which is the ranging code number transmitted from the base station. The range of 0 to RangingCode is required to create ranging code sequences and contents out of the range of 0 to RangingCode are not needed.

When it is additionally requested to generate ranging code sequence out of range of the ranging code (NewRangingCode>RangingCode), the initial register value for the corresponding ranging code does not exist in the memory. Herein, only an initial register value with respect to ranging codes from a ranging code RangingCode+1 to a ranging code NewRangingCode is incrementally regenerated and saved in the memory.

Also, when the new uplink permbase value is transmitted from the base station and the new uplink permbase is different from old uplink permbase, the present invention generates new initial register values with respect to a range value ranging 0 to RangingCode. In this case, since the first initial register value is changed according to the change of the new uplink permbase, a new initial register value for each ranging code should be created.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
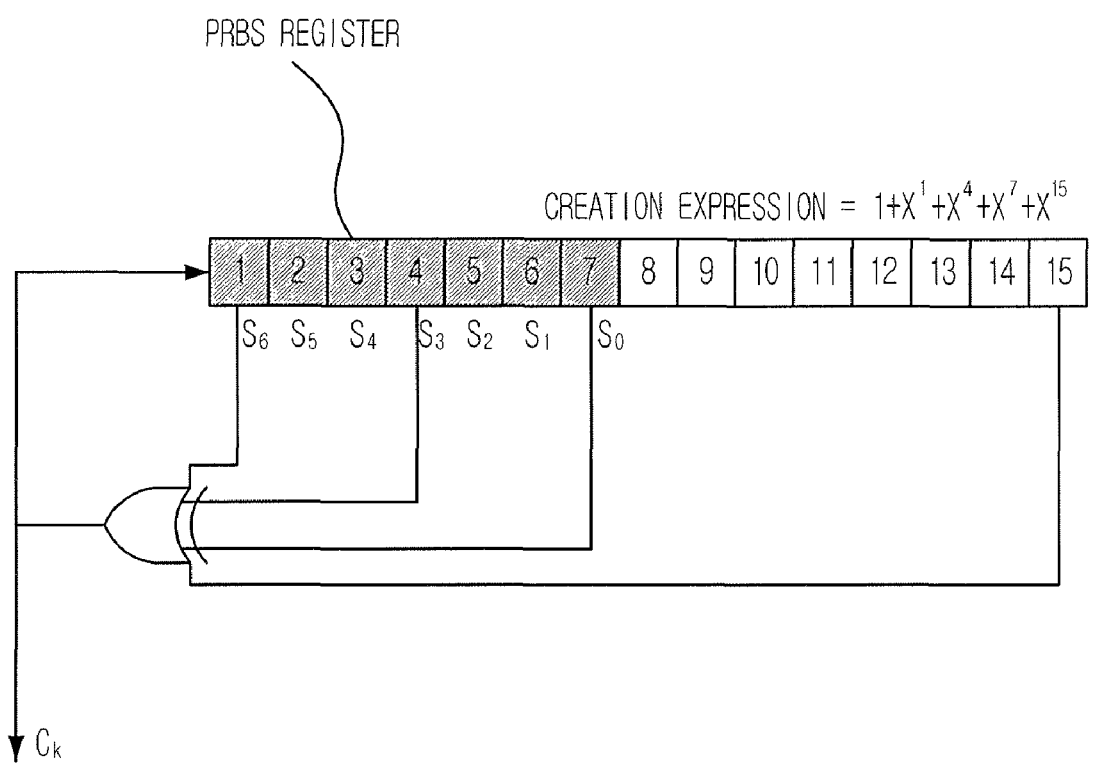
FIG. 1 shows a conventional ranging circuit for generating a binary code sequence.
Figure 2:
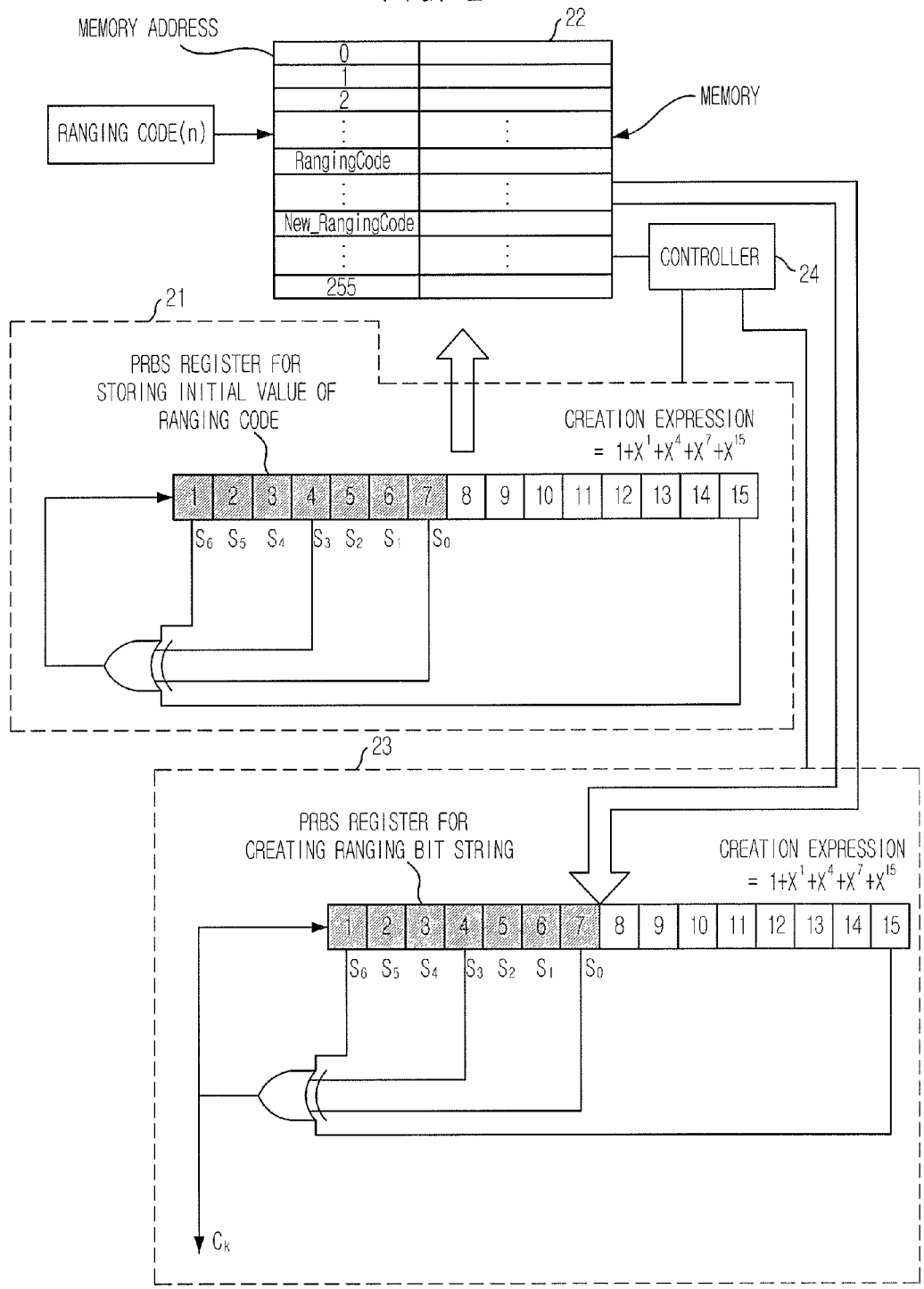
FIG. 2 is a diagram showing an apparatus for generating a ranging binary code sequence at a high-speed in accordance with an embodiment of the present invention.

FIG. 2 is a diagram showing an apparatus for generating a ranging binary code sequence at a high-speed in accordance with an embodiment of the present invention. In FIG. 2, a circuit for gradually generating an initial register value of a pseudo random bit sequence (PRBS) register with respect to a ranging code and storing the initial register value in a memory and a circuit for extracting an initial value of a PRBS register corresponding to the ranging code from the memory and generating a binary code sequence are independently realized.

As shown in FIG. 2, the apparatus for generating a ranging binary code sequence at a high-speed according to the present invention includes an initial register value generator 21, a memory 22, a binary code sequence generator 23, and a controller 24. The initial register value generator 21 generates an initial register value of each ranging code to a ranging code within a predetermined range (which is between ranging code 0 and ranging code number received from base station) based on the initial value recorded in the controller 24. The memory 22 stores an initial register value of each ranging code generated in the initial value generator 22. The binary code sequence generator 23 generates a binary code sequence of a corresponding ranging code based on the initial register value of chosen ranging code from the memory 23.

The controller 24 receives a first frame including a first uplink permbase, i.e., UL_PermBase, and a first ranging code number, i.e., RangingCode, from a base station, records the first UL_PermBase value in a register of the initial register value generator 21, generates an initial register value of each ranging code, which ranges from the ranging code 0 to the received ranging code, i.e., RangingCode, through the recorded initial value, and controls a procedure of storing the initial register value in the memory 22. When a second uplink permbase value on a second frame transmitted from the base station is the same as the first uplink permbase value, the controller 24 compares the second ranging code with the first ranging code. When the second ranging code is smaller than the first ranging code, the controller 24 records the initial register value, which is stored in the memory 22, of the second ranging code in the register of the binary code sequence generator 23. When the second ranging code is larger than the first ranging code, the controller 24 controls the initial register value generating procedure to generate initial register values from (RangingCode+1) to the second ranging code number and to save the initial register values in memory 22. The controller 24 reads an initial register value of a second ranging code in the memory 22, saves the initial register value in register of PRBS 23, and controls each constitutional element to generate a binary code sequence of second ranging code.

When the second uplink permbase value on the second frame transmitted from the base station is not the same as the first uplink permbase value, the controller 24 defines the second uplink permbase value as an first initial value of PRBS 21 and repeats the initial register value generating procedure from ranging code 0 to the second ranging code number.

Figure 3:
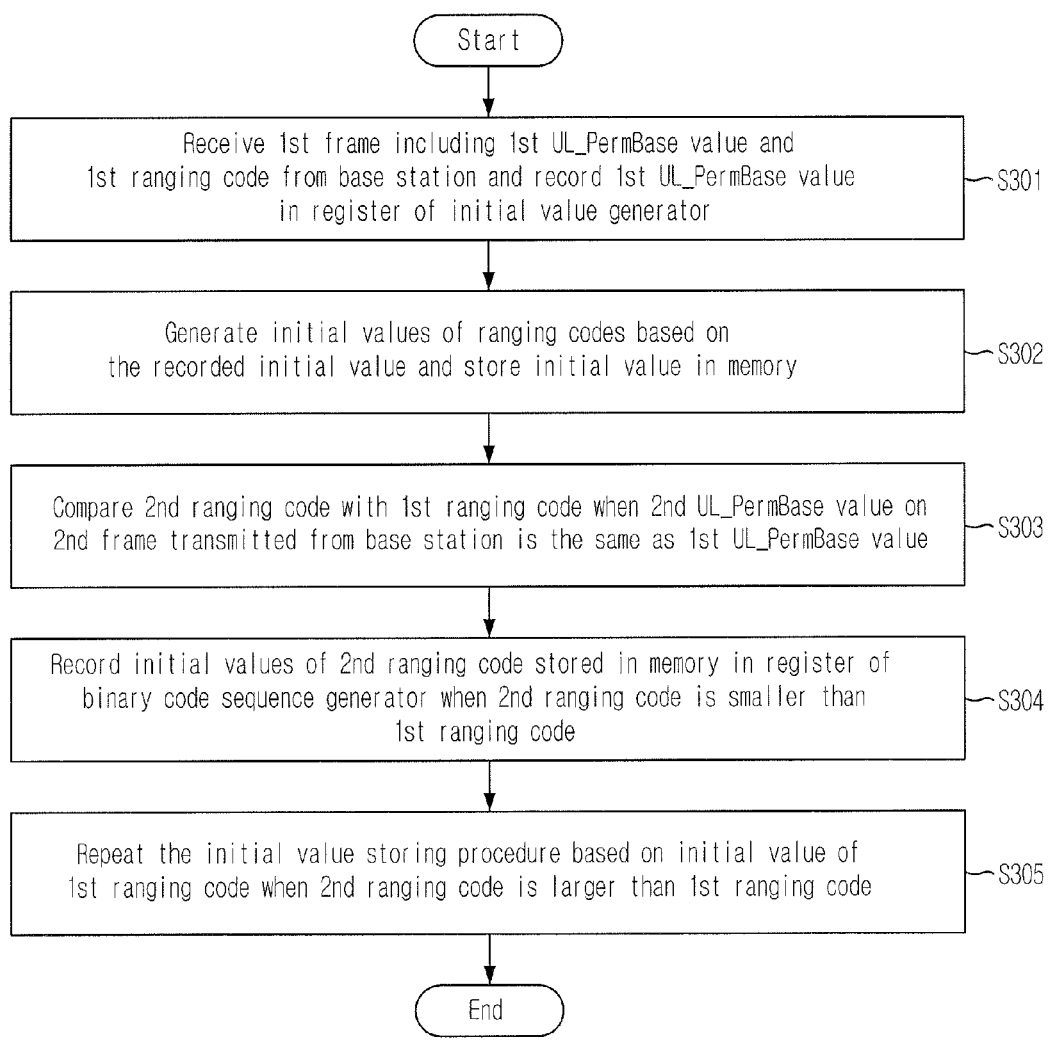
FIG. 3 is a global flowchart describing a method for generating the ranging binary code sequence at a high-speed in accordance with an embodiment of the present invention.

FIG. 3 is a global flowchart describing a method for generating the ranging binary code sequence at a high-speed in accordance with an embodiment of the present invention.

When the first frame including the first uplink permbase and the first ranging code from the base station is received, the first uplink permbase value is recorded in the register of the initial value generator 21 at step S301.

An initial register value for each of the ranging codes from the ranging code 0 to the received first ranging code number is generated and stored in the memory 22 at step S302.

When the second uplink permbase value on the second frame transmitted from the base station is the same as the first uplink permbase value, the second ranging code number is compared with the first ranging code number at step S303.

When the second ranging code number is smaller than the first ranging code number, an initial value of the second ranging code number stored in the memory 22 is recorded in the register of the binary code sequence generator 23 at step S304.

When the second ranging code number is larger than the first ranging code number, the initial register value generating procedure is repeated to the second ranging code number based on the initial register value of the first ranging code number at step S305.

When the second uplink permbase value on the second frame transmitted from the base station is not the same as the first uplink permbase value, the initial register value generating procedure is newly repeated from ranging code 0 to the second ranging code number by defining the second uplink permbase value as an initial value.

Figure 4:
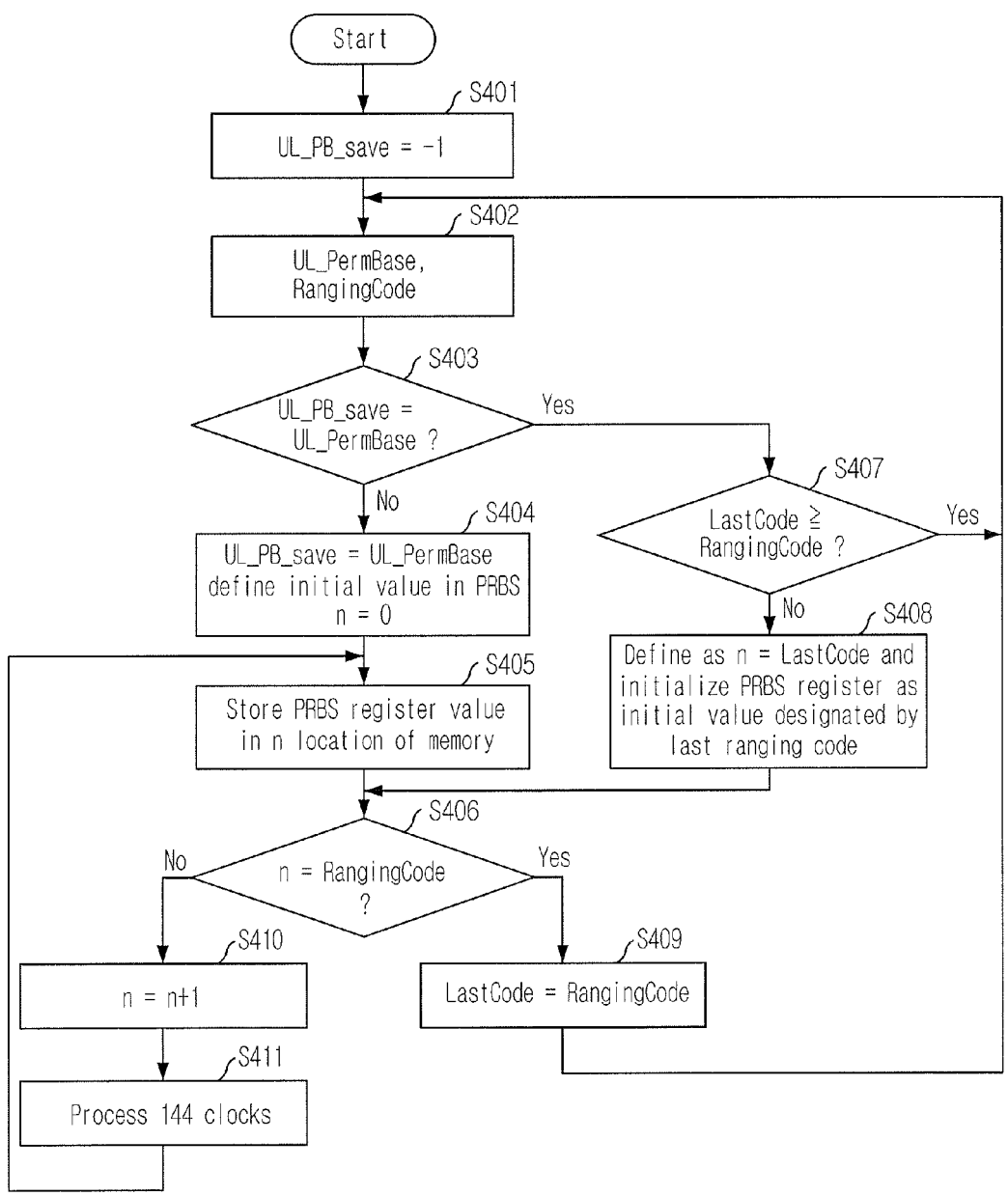
FIG. 4 is a detailed flowchart describing a procedure of generating and storing an initial register value of each ranging code in accordance with an embodiment of the present invention.

FIG. 4 is a flowchart describing a procedure of generating and storing an initial register value of each ranging code in accordance with an embodiment of the present invention.

A variable for storing an uplink permbase value, which is an "UL_PB_save" value, is initialized as a value of −1, which cannot be generally owned, to sense the change of the initially received uplink permbase uplink permbase value at step S401. The object of the step S401 is to generate an initial register value of ranging code 0 and store the initial register value in the memory by defining the uplink permbase value transmitted from the base station as an first initial register value when the mobile WiMax terminal is initially operated.

An uplink permbase value and a ranging code number are transmitted from the base station at step S402. The uplink permbase value and the ranging code number are received on the basis of frame unit. The base station may not transmit ranging information if ranging signal transmission is not necessary.

The uplink permbase value transmitted from the base station is compared with the uplink permbase value variable, i.e., UL_PB_save, at step S403.

When the uplink permbase value is not the same as the "UL_PB_save" value, the "UL_PB_save" value is defined as a new uplink permbase value and the first initial register value of the initial register value generator 21 is initialized as an initial value of standard at step S404. Also, a ranging code value number n is initialized as 0. The first initial register value is a value designated in a standard document and includes an uplink permbase value of 7-bit-string and a value of bit string 00101011.

The initial register value of the initial register value generator 21, which is a register value of PRBS with respect to the ranging code number n, is stored in an n location of the memory 22 at step S405 and the logic flow goes to step S406.

When the uplink permbase value is the same as the "UL_PB_save" value, it means that the uplink permbase value is not changed. Subsequently, a last ranging code, i.e., LastCode, stored in the memory 22 is compared with the received ranging code number at step S407.

When the last ranging code number is larger than the received ranging code number, the logic flow goes to the step S402.

When the last ranging code number is smaller than the received ranging code number, the value of variable n is defined as the last ranging code value and an initial register value designated by the last ranging code number on the memory 22 is recorded in the PRBS register value at step S408. Subsequently, the logic flow goes to the step S406. The object of the step S408 is to incrementally generate the initial register value with respect to the non-generated ranging code number.

It is checked at step S406 whether the value of variable n is the last valid ranging code number.

When the value of n is a received ranging code number, initial register value generating procedure ends and the last ranging code variable is updated as a received ranging code number at step S409. Subsequently, the logic flow goes to the step S402.

When the value of variable n is not the final valid ranging code, the value of the ranging code variable n is defined as a value of n+1, which is a value adding 1 to the value of variable n, at step S410.

144 clocks, which are the length of the binary ranging code sequence, are processed to acquire an initial register value of a next ranging code number at step S411.

In the initial register value generating and storing procedure of each ranging code number, the steps S405, S406, S410 and S411 are processed on the basis of 144 clocks unit. The steps S405, S406, and S410 are simultaneously processed in a newly starting first part among 144 clocks ranging 0 to 143. Subsequently, 144 clocks are processed.

Therefore, the number of clocks consumed in the procedure for storing the initial value with respect to the ranging code in the memory is 144×(RangingCode-1)+1.

In a procedure for generating a ranging code initial register value with respect to all valid ranging code numbers through the above procedure and generating a ranging binary code sequence with respect to a corresponding ranging code number, a ranging binary code sequence is generated by extracting an initial register value of a corresponding ranging code number in the memory 22 and recording the initial register value of the ranging code number in the PRBS register of the binary code sequence generator 23.

Figure 5:
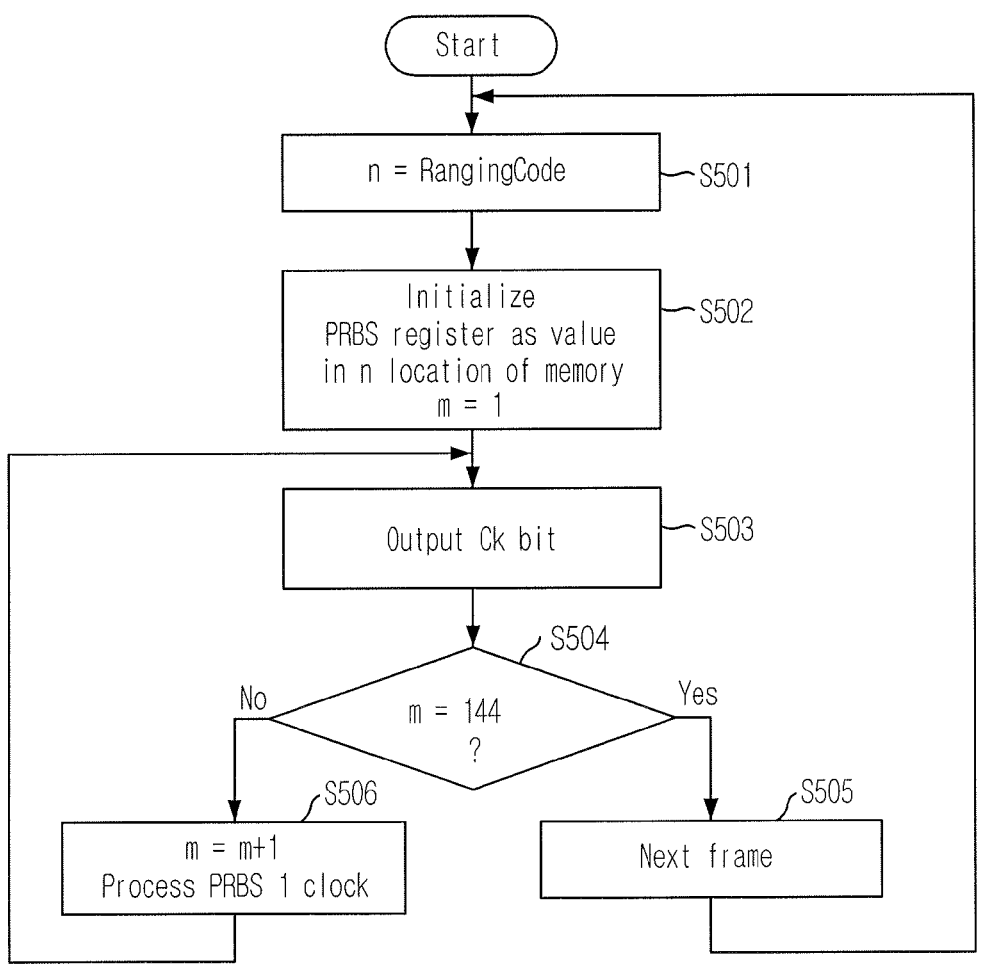
FIG. 5 is a detailed flowchart describing a binary code sequence generating procedure in accordance with the embodiment of the present invention.

FIG. 5 is a flowchart describing a binary code sequence generating procedure in accordance with an embodiment of the present invention.

A ranging code number corresponds to an address n of the memory 22 at step S501.

A ranging initial register value whose address corresponds to n is extracted from the memory 22 and defined as an initial value in the PRBS register of the binary code sequence generator 23, and a clock number m is initialized as 1 at step S502.

An output value $C_k$ of the binary code sequence generator 23 is outputted at step S503.

It is checked at step S504 whether the clock number m is 144.

When the value of m is 144, generation of the current ranging binary code sequence ends and a next frame is waited at step S505.

When the value of m is smaller than 144, the value of m increases by 1 and the binary code sequence generating procedure is processed as many as 1 clock, i.e., one binary code is generated. Subsequently, the logic flow goes to the step S503.

In the binary code sequence generating procedure, since the steps S503, S504 and S506 can be processed in parallel, the steps S503, S504 and S506 are processed as one clock.

Therefore, the ranging code sequence generating procedure for the ranging code is processed at a time of 144 clocks excluding a procedure for defining the ranging code initial register value in the memory.

The present invention can reduce a part doubly generated when 144 code sequences are generated based on a ranging code number and decrease a generation time by incrementally generating an initial register value of pseudo random bit sequence (PRBS) of only a minimum valid ranging code range based on an uplink permbase value and a ranging code number transmitted from a base station, storing the initial register value in a memory, extracting an initial register value of a corresponding ranging code number stored in the memory, recording the initial value in a PRBS register of a ranging circuit, performing the ranging circuit as long as a length of the binary code sequence, and generating a ranging signal, and a method thereof.

Also, the present invention can shorten a generation time of a ranging bit string by generating an initial register value of a ranging code number with respect to only a valid ranging code range of 0 to RangingCode among a total of 0 to 255 ranging codes in a terminal of the mobile WiMax system, and removing doubly generated a bit string when the uplink permbase value is changed within a small range.

Also, the present invention can reduce redundant parts, which are the unnecessarily generated ranging codes even when the uplink permbase value is changed within a large range by handoff.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

The present application contains subject matter related to Korean patent application No. 2006-0065941, filed with the Korean Intellectual Property Office on Jul. 13, 2007, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for generating a ranging binary code sequence at a high-speed, comprising:
   an initial register value generating means for generating an initial register value of each of only valid ranging codes in a predetermined range based on an initial value;
   a storing means for storing the generated initial register values of the only a minimum ranging codes;
   a binary code sequence generating means for generating a binary code sequence of a corresponding ranging code based on the stored initial register value of given ranging code; and
   a control means for receiving a first frame including a first uplink permbase value, which is a UL_PermBase value, and a first ranging code from a base station, recording the first uplink permbase value in the register of the initial register value generating means, generating the initial register value of each of ranging codes ranging from the ranging code 0 to the received first ranging code number_through the recorded initial register value, controlling the above initial register value storing procedure, reading an initial register value of a corresponding ranging code number in the storing means, and controlling each constitutional element to generate a binary code sequence.

2. The apparatus as recited in claim 1, wherein when a second uplink permbase value on a second frame transmitted from the base station is the same as the first uplink permbase value, the control means compares a second ranging code with the first ranging code, records the initial register value of the second ranging code number stored in the storing means in the register of the binary code sequence generating means in case that the second ranging code number is smaller than the first ranging code number, and repeats the initial register value storing procedure to the second ranging code number based on the initial register value of the first ranging code number in case that the second ranging code number is larger than the first ranging code number.

3. The apparatus as recited in claim 2, wherein when the second uplink permbase value on the second frame transmitted from the base station is not the same as the first uplink permbase value, the control means repeats the initial register value storing procedure to the second ranging code number by defining the second uplink permbase value as an initial register value.

4. A method for generating a ranging binary code sequence at a high-speed, comprising the steps of:
   a) receiving a first frame including a first uplink permbase value, which is a UL_PermBase, and a first ranging code from the base station and recording the first uplink permbase value in a register of an initial value generator;
   b) generating an initial value of each of ranging codes ranging from the first ranging code to the received first ranging code through the recorded initial register value and storing the initial register value of each ranging code in a memory; and
   c) reading an initial register value of a corresponding ranging code in the memory and generating a binary code sequence.

5. The method as recited in claim 4, further comprising the steps of:
   d) receiving a second frame including a second uplink permbase value and a second ranging code number from the base station;
   e) when the second uplink permbase value is the same as the first uplink permbase value, comparing the second ranging code number with the first ranging code;
   f) when the second ranging code number is smaller than the first ranging code number, recording an initial value of the second ranging code stored in the memory in the register of the binary code sequence generator; and
   g) when the second ranging code number is larger than the first uplink ranging code number, incrementally repeating the step b) based on the initial value of the first ranging code number.

6. The method as recited in claim 5, further comprising the step of:
   h) when the second uplink permbase value on the second frame transmitted from the base station is not the same as the first uplink permbase value, doing again the step b) to the second ranging code by defining the second uplink permbase value as an initial register value of ranging code 0.

\* \* \* \* \*